United States Patent
Loe et al.

(10) Patent No.: US 6,811,349 B1
(45) Date of Patent: Nov. 2, 2004

(54) RETAINING RING APPARATUS

(75) Inventors: Derril A. Loe, Williamston, MI (US); Teodor Mostior, Ann Arbor, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/437,572

(22) Filed: May 14, 2003

(51) Int. Cl.[7] .................................................. F16B 321/18
(52) U.S. Cl. ........................ 403/327; 411/353; 411/332; 464/182
(58) Field of Search ............................... 403/315–320, 403/409.1, 381, 332, 325–327; 411/516–519, 521, 352, 353; 285/321; 464/182

(56) References Cited

U.S. PATENT DOCUMENTS

| 4,343,581 | A | * | 8/1982 | Millheiser | 411/517 |
| 4,380,405 | A | * | 4/1983 | Kaneki et al. | 403/318 |
| 4,447,171 | A | * | 5/1984 | Baldoni et al. | 403/381 |
| 5,897,146 | A | * | 4/1999 | Saito et al. | 285/321 X |
| 6,101,920 | A | * | 8/2000 | Leonhardt | 403/381 X |
| 6,348,001 | B2 | * | 2/2002 | Killop | |
| 6,663,145 | B1 | * | 12/2003 | Lyall et al. | 285/321 X |

* cited by examiner

Primary Examiner—Daniel P. Stodola
Assistant Examiner—Ryan M. Flandro
(74) Attorney, Agent, or Firm—Leslie C. Hodges

(57) ABSTRACT

A retaining ring apparatus includes a C-ring and a groove within a shaft. The shaft groove has a tapered edge at one side thereof and the C-ring has at least one tapered surface, which is disposed in mating relationship with the tapered surface of the groove. The retaining ring apparatus is disposed within a larger structure, which has at least one mechanism for applying an axial force to the retaining ring to ensure the mating of the tapered surfaces.

3 Claims, 2 Drawing Sheets

RETAINING RING APPARATUS

TECHNICAL FIELD

This invention relates to retaining rings and, more particularly, to external retaining rings disposed in a groove in a shaft.

BACKGROUND OF THE INVENTION

Many mechanical devices employ at least one rotating shaft in which a rotating or retaining ring is disposed. The purpose of the retaining ring is to limit the movement of at least one mechanical member in a given direction, thereby setting the limits of assembly movement for that particular component.

One of the problems facing external retaining rings is that of centrifugal force. As the shaft in which the retaining ring is disposed rotates at high speed, the ring itself has a tendency to expand and thereby become loosened within the groove and perhaps even be expelled from the groove. There have been many retaining ring designs proposed to alleviate this problem. One of the designs that has been fairly successful is a spiral lock or a spiraling structure. However, the more conventional C-ring structure has remained as the mainstay of locating rings since the manufacture thereof is less expensive.

SUMMARY OF THE INVENTION

It is an object of the present invention to provide an improved retaining ring apparatus having a structural configuration, which inhibits expulsion from a retaining groove.

In one aspect of the present invention, a rotatable shaft has formed therein a groove with a tapered edge.

In another aspect of the present invention, a retaining ring having a tapered edge or wall is disposed in the groove in mating relationship with the tapered edge of the shaft groove.

In still another aspect of the present invention, a linear force is applied to the retaining ring to ensure complete mating of the tapered surfaces of the groove and ring.

In a further aspect of the present invention, the mating of the tapered ring and shaft inhibits outward movement of the retaining ring due to centrifugal forces being applied thereto.

In a yet further aspect of the present invention, the taper of the shaft groove and retaining ring are at an angle wherein the top of the groove is narrower than the bottom of the groove.

In a still further aspect of the present invention, the mating of the tapered surfaces increases the frictional characteristics of the mating parts to inhibit the outward movement of the retaining ring during centrifugal force application.

DESCRIPTION OF EXEMPLARY EMBODIMENTS

Figure 1:
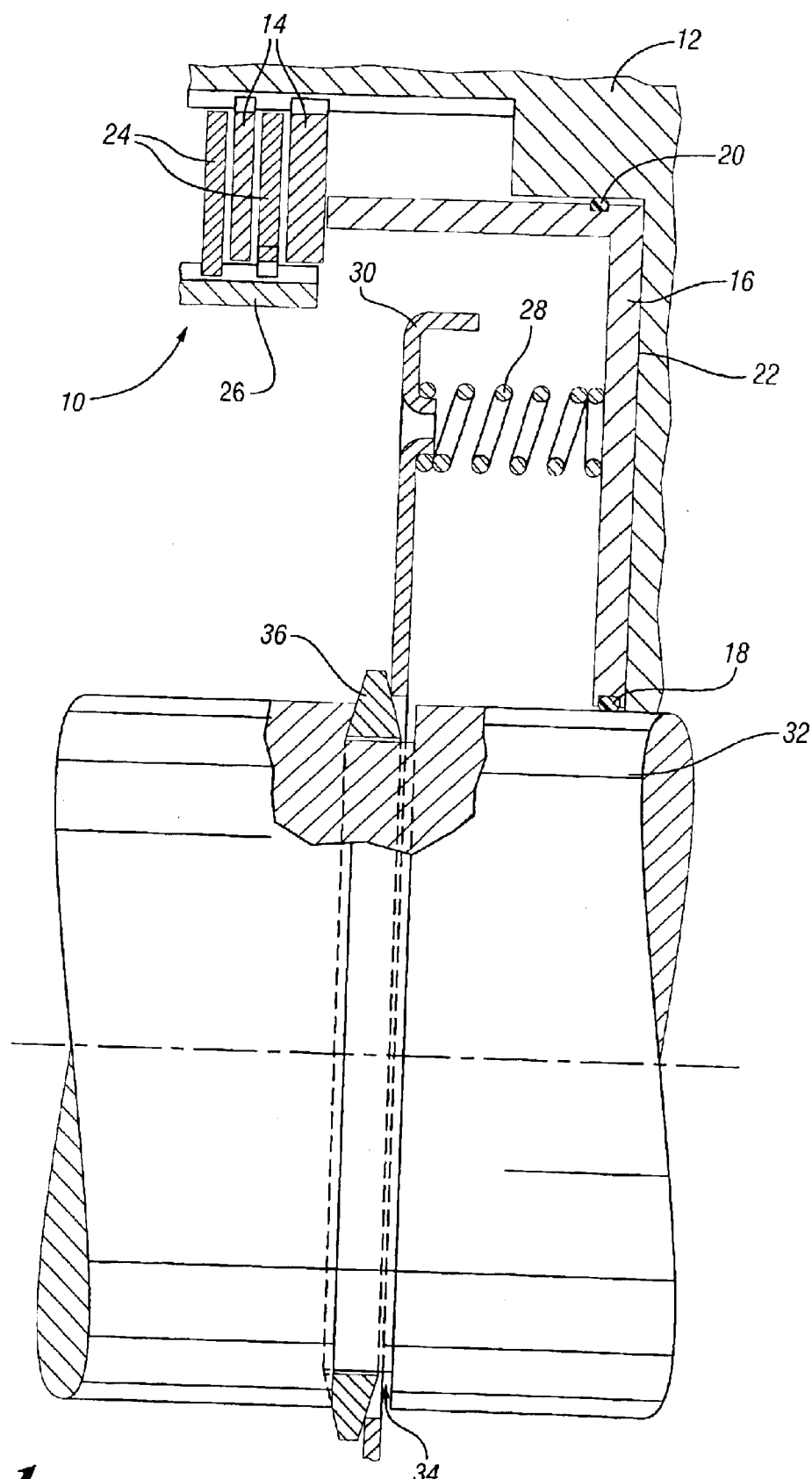
FIG. 1 is an elevational view of a portion of a transmission friction torque-transmitting assembly having a retaining ring and shaft groove constructed in accordance with the present invention.

In FIG. 1, there is seen a portion of a transmission torque-transmitting mechanism 10. This torque-transmitting mechanism 10 includes a housing 12 in which is splined a plurality of plates 14. Slidably disposed within the housing 12 is a piston 16, which has an inner seal 18 and an outer seal 20 such that a chamber 22 formed between the piston 16 and the housing 12 is capable of holding fluid.

Interdigitated with the plates 14 is a plurality of plates 24. These plates 24 are splined with a housing shown at 26. When the piston 16 is pressurized by fluid in the chamber 22, the plates 14 and 24 are brought into frictional engagement thereby providing common rotation between the housing 12 and the housing 26. The piston 16 is urged rightward, as viewed in FIG. 1, by a plurality of springs 28, which are disposed between the piston 16 and a retainer plate 30.

The housing 12 is rotatably connected with a shaft 32 such that the housing 12, piston 16, plates 14, and retainer plate 30 rotate in unison. The shaft 32 has formed therein a circumferential groove 34 in which is disposed a retaining ring 36. The retaining ring 36 is abutted by the retainer plate 30 and therefore is a reactive member for the forces of the springs 28.

Figure 2:
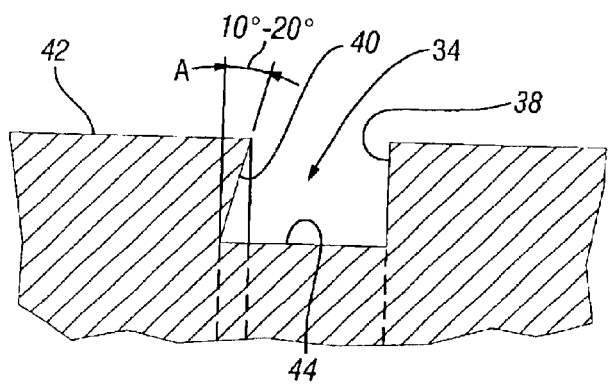
FIG. 2 is a cross-sectional view of a portion of a shaft having a tapered groove formed therein.

The groove 34, as seen in FIG. 2, has a substantially radial edge or wall 38 and a tapered edge or wall 40. The edge 40 is tapered at an angle A relative to the radial direction of the shaft 32. With this configuration, the opening at an outer surface 42 of the shaft 32 is narrower than a radially inner circumferential surface 44 of the groove 34.

Figure 3:
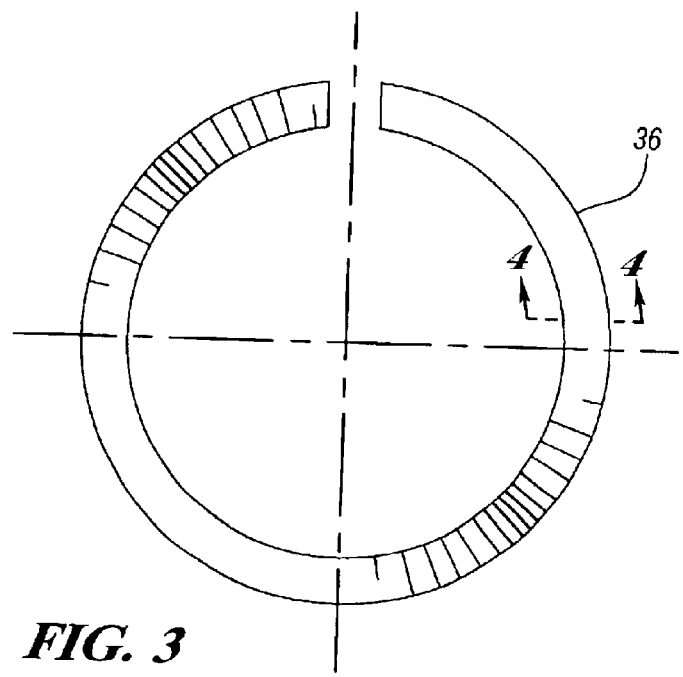
FIG. 3 is an elevational view of a C-ring incorporating the present invention.

The retaining ring 36 is essentially a C-ring, as seen in FIG. 3. The cross section of the C-ring 36 has tapered edges 46 and 48. The tapered edges 46 and 48 form an angle B with the radial direction D of the ring 36. One of these edges 46 or 48 is disposed in abutment with the edge 40 when the retaining ring 36 is assembled within the groove 34.

Figure 5:
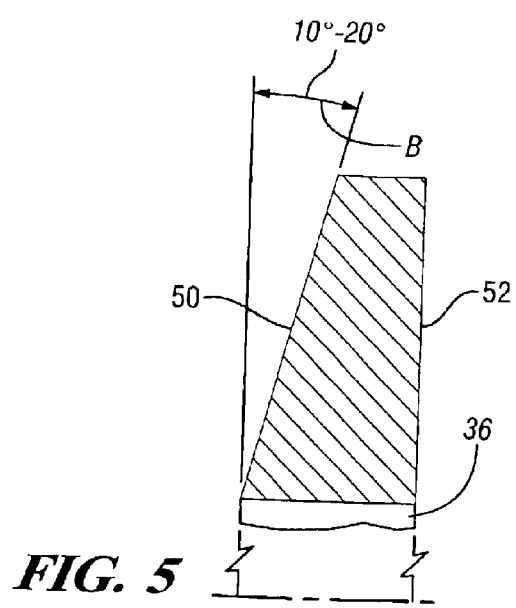
FIG. 5 is a view similar to FIG. 4 showing an optional design for the cross section of the retaining ring.

FIG. 5 shows an alternative embodiment of the retaining ring 36 wherein the ring has a tapered edge or wall 50 and a straight radial edge or wall 52. The tapered edge 50 is formed at an angle B relative to the radial direction D of the ring 36 while the edge 52 is formed as a radial surface on the ring 36.

When the ring 36 is assembled within the transmission torque-transmitting mechanism 10, the springs 28 and retainer plate 30 urge the ring 36 leftward, as seen in FIG. 1, in the groove 34 such that the tapered surfaces are disposed in abutment. Those skilled in the art will recognize that with the tapered surfaces the centrifugal forces, which are applied to the ring 36 through the rotation of the shaft 32, will be combated by the frictional engagement between the tapered surfaces.

Figure 4:
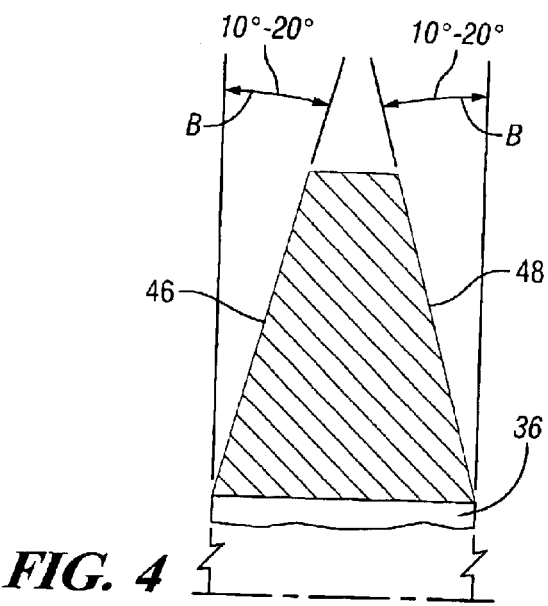
FIG. 4 is a view taken along line 4—4 of FIG. 3 showing the cross-sectional elevation of the retaining ring.

The force of the springs 28 ensure that an axial force is applied to the ring 36 thereby maintaining the tapered surfaces in abutment with each other. The cross-sectional surface of the ring shown in FIG. 4 is such that the ring 36 cannot be misassembled within the groove 34. The cross section shown in FIG. 5, while being an easier manufacturing structure, has need to be assembled correctly within the groove 34 and therefore requires some education for the installer.

What is claimed is:

1. A retaining ring apparatus comprising:

a shaft having a circumferential groove formed therein, said groove expanding in width in a direction toward the center of said shaft to form at least one tapered wall;

a retaining ring disposed in said groove, said retaining ring having a mating tapered surface disposed in radial abutment with said tapered wall; and resilient means independent of and separate from said retaining ring for applying an axial force to said retaining ring on a surface disposed axially from said mating tapered surfaces to urge abutment of said tapered surfaces.

2. The retaining ring apparatus defined in claim 1 further wherein:

said means for applying an axial force is comprised of a plurality of spring members and a plate.

3. The retaining ring apparatus defined in claim 1 further comprising:

said retaining ring comprising a C-ring having two tapered side walls and circumferential inner and outer walls, wherein said inner wall is wider that said outer wall.

* * * * *